(12) United States Patent
Ley et al.

(10) Patent No.: US 7,378,121 B2
(45) Date of Patent: May 27, 2008

(54) USE OF FERULIC ACID AMIDES AS FLAVOR COMPOUNDS

(75) Inventors: Jakob Peter Ley, Holzminden (DE); Gerhard Krammer, Holzminden (DE); Sylvia Muche, Holzminden (DE); Günter Kindel, Höxter (DE); Ingo Reiβ, Holzminden (DE)

(73) Assignee: Symrise GmbH & Co. KG (DE)

( * ) Notice: Subject to any disclaimer, the term of this patent is extended or adjusted under 35 U.S.C. 154(b) by 191 days.

(21) Appl. No.: 10/325,406

(22) Filed: Dec. 20, 2002

(65) Prior Publication Data
US 2003/0152682 A1 Aug. 14, 2003

(30) Foreign Application Priority Data
Dec. 27, 2001 (DE) .................................. 10164263
May 23, 2002 (DE) .................................. 10222883

(51) Int. Cl.
*A23L 1/22* (2006.01)

(52) U.S. Cl. .................... 426/534; 426/592; 426/638

(58) Field of Classification Search ................ 426/534, 426/536, 592, 638, 650
See application file for complete search history.

(56) References Cited

U.S. PATENT DOCUMENTS

| | | |
|---|---|---|
| 1,329,272 A | 1/1920 | Nelson |
| 6,117,365 A | 9/2000 | Ley |

FOREIGN PATENT DOCUMENTS

JP 2000-129257 * 5/2000

OTHER PUBLICATIONS

"Beziehung Zwischen Chemischer Konstitution und Scharfen Geschmack bei Säureamiden" Chemisches Zentralblatt, XX, XX, vol. 99, (1928), pp. 1028-1031, XP000925852.
Josette Martin-Tanguy et al., "The Distribution of Hydroxycinnamic Acid Amides in Flowering Plants", vol. 17, No. 11, (1978), pp. 1927-1928, XP000925834.
Patent Abstracts of Japan, vol. 2000, No. 8, Oct. 6, 2000.

* cited by examiner

*Primary Examiner*—Leslie Wong
(74) *Attorney, Agent, or Firm*—Akerman Senterfitt; Gregory A. Nelson; Gregory M. Lefkowitz

(57) ABSTRACT

The present invention relates to the use of various ferulic acid amides as pungent compounds and aroma compounds having a heat-generating effect in preparations used in nutrition, oral hygiene or consumed for pleasure.

13 Claims, 2 Drawing Sheets

USE OF FERULIC ACID AMIDES AS FLAVOR COMPOUNDS

FIELD OF THE INVENTION

The present invention relates to the use of N-[2-(4-hydroxy-3-methoxyphenyl)ethyl]-3-(4-hydroxy-3-methoxyphenyl)-(2E)-propenamide or N-[2-(4-hydroxy-3-methoxyphenyl)ethyl]-3-(4-hydroxy-3-methoxyphenyl)-(2Z)-propenamide (hereinafter feruloylmethoxytyramines for short), N-[2-(4-hydroxy-3-methoxyphenyl)ethyl]-3-(4-hydroxy-3-methoxyphenyl)-propenamide (hereinafter dihydroferuloylmethoxytyramine for short), N-[2-(3,4-dihydroxyphenyl)ethyl]-3-(4-hydroxy-3-methoxyphenyl)-(2E)-propenamide or N-[2-(3,4-Dihydroxyphenyl)ethyl]-3-(4-hydroxy-3-methoxyphenyl)-(2Z)-propenamide (hereinafter feruloyldopamines for short), N-[2-(4-hydroxyphenyl)ethyl]-3-(3,4-dihydroxyphenyl)-(2 E)-propenamide or N-[2-(4-hydroxyphenyl)ethyl]-3-(3,4-dihydroxyphenyl)-(2Z)-propenamide (hereinafter caffeoyltyramines for short) and N-[2-(3,4-dimethoxyphenyl)ethyl]-3-(3,4-dimethoxyphenyl)-(2E)-propenamide or N-[2-(3,4-dimethoxyphenyl)ethyl]-3-(3,4-dimethoxyphenyl)-(2Z)-propenamide (hereinafter rubenamines for short) as flavor compounds, such as pungent principles and flavor compounds having a heat-generating effect in preparations used in nutrition, oral hygiene or consumed for enjoyment. In addition, the present invention relates to preparations used in nutrition, oral hygiene or consumed for pleasure which contain the ferulic acid amides of the present invention, and to processes for preparing the novel preparations.

BACKGROUND OF THE INVENTION

Capsaicin [N-(4-hydroxy-3-methoxybenzyl)-8-methyl-(6E)-nonenamide] and other capsaicinoids have been known since as long as 1871 as hot-tasting and heat-generating flavor compounds from various Capsicum species, in particular chilli. At an appropriately low dose of the capsaicinoids (the threshold is at a dilution of approximately $1:10^5$), only a pleasant neutral pungency and a hot feeling in the mouth are perceived. A problem with capsaicin is its high acute toxicity ($LD_{50}$ (mouse oral) 47 mg), which makes it difficult to apply in preparations, and the chronic gastritis, kidney damage and liver damage which occur with frequent use and overdose (Römpp Lexikon Naturstoffchemie, [Römpp's dictionary of the chemistry of natural substances], Thieme, 1997, p. 109). Thus, despite the good sensory properties, there is a requirement for less problematic pungent principles. Although piperine (1-piperoylpiperidine), a constituent of white pepper, also causes a very hot impression (Römpp Lexikon Naturstoffchemie, Thieme 1997, p. 500), compared with capsaicin, it displays a relative pungency of only approximately 1%. Furthermore, piperine has an intense characteristic taste reminiscent of pepper, so that in many preparations it can only be used with restrictions.

EINBETTEN

The literature describes some pungent principles based on 4-hydroxy-3-methoxybenzylamine (hereinafter vanillylamine). Chemical Products, 1954, March, pp. 102-106 gives an extensive list of substances evaluated. These include N-(4-hydroxy-3-methoxybenzyl)-4-hydroxy-3-methoxy-(2E)-propenamide (ferulic acid N-vanillylamide) which, in contrast to the vanillylamides of long-chain aliphatic acids, is not described as pungent.

Accordingly, it is an object of the present invention to find substances having a pungent and heat-generating effect and a neutral flavor profile which occur naturally and can be used as flavor compounds in preparations used in nutrition, oral hygiene or consumed for pleasure.

SUMMARY OF THE INVENTION

The present invention therefore relates to the use of N-[2-(4-hydroxy-3-methoxyphenyl)ethyl]-3-(4-hydroxy-3-methoxyphenyl)-(2E)-propenamide (trans-feruloyl-methoxytyramine), N-[2-(4-hydroxy-3-methoxyphenyl)ethyl]-3-(4-hydroxy-3-methoxyphenyl)-(2Z)-propenamide (cis-feruloylmethoxytyramine), N-[2-(4-hydroxy-3-methoxyphenyl)ethyl]-3-(4-hydroxy-3-methoxyphenyl)-propenamide (dihydroferuloylmethoxytyramine), N-[2-(3,4-dihydroxyphenyl)ethyl]-3-(4-hydroxy-3-methoxyphenyl)-(2E)-propenamide (trans-feruloyldopamine), N-[2-(3,4-dihydroxyphenyl)ethyl]-3-(4-hydroxy-3-methoxyphenyl)-(2Z)-propenamide (cis-feruloyldopamine), N-[2-(4-hydroxyphenyl)ethyl]-3-(3,4-dihydroxyphenyl)-(2E)-propenamide (trans-caffeoyltyramine), N-[2-(4-hydroxyphenyl)ethyl]-3-(3,4-dihydroxyphenyl)-(2Z)-propenamide, (cis-caffeoyltyramine), N-[2-(3,4-dimethoxyphenyl)ethyl]-3-(3,4-dimethoxyphenyl)-(2E)-propenamide (trans-rubenamine) and/or N-[2-(3,4-dimethoxyphenyl)ethyl]-3-(3,4-dimethoxyphenyl)-(2Z)-propenamide (cis-rubenamine) as flavor compounds, preferably as pungent principles and flavor compounds having a heat-generating effect, more preferably as pungent principles and flavor compounds having a heat-generating effect in preparations used in nutrition, oral hygiene or consumed for pleasure.

The present invention further relates to preparations, semi-manufactured products and odor, flavor and taste compositions containing these compounds.

EINBETTENTrans-Feruloylmethoxytyramine (CAS No. 78510-19-7) has already been described, for example, in Agric. Biol. Chem., 1984, 48 (6), 1653-1654 as a constituent of sugarbeet seeds. According to Nat. Med., 1994, 48 (4), 304-306, feruloyldopamine has been found in *Atraphaxis spinosa* L., var. *sinaica* Boiss. cis-Feruloylmethoxytyramine (CAS No. 219773-49-6) has been found in the seeds of an onion species (*Allium tuberosum*) (Zhongcaoyao, 2000, 31 (4), pp. 244 ff.; Chemical Abstracts 2000, Vol. 133, 263831). JP 2000 129,257 describes the use of trans-feruloyl-methoxytyramine and trans-feruloyldopamine as antioxidants for therapeutic applications. trans-Caffeolytyramine has been found, for example, in onion species (Biosci. Biotech. Biochem. Vol. 61,1997, Issue 7, pages 1138-1141). Trans-Rubenamine has been found in Zanthoxylum species (Phytochemistry Vol. 28, 1989, pp. 839ff.).

In the literature, the use as flavor compounds, in particular the use as pungent and hot-tasting flavor compounds, is not described.

Surprisingly, the inventive ferulic acid amides show a pleasantly pungent and hot taste impression, which is neutral and persists for a relatively long time in sensory testing.

DETAILED DESCRIPTION OF THE INVENTION

Figure 1:
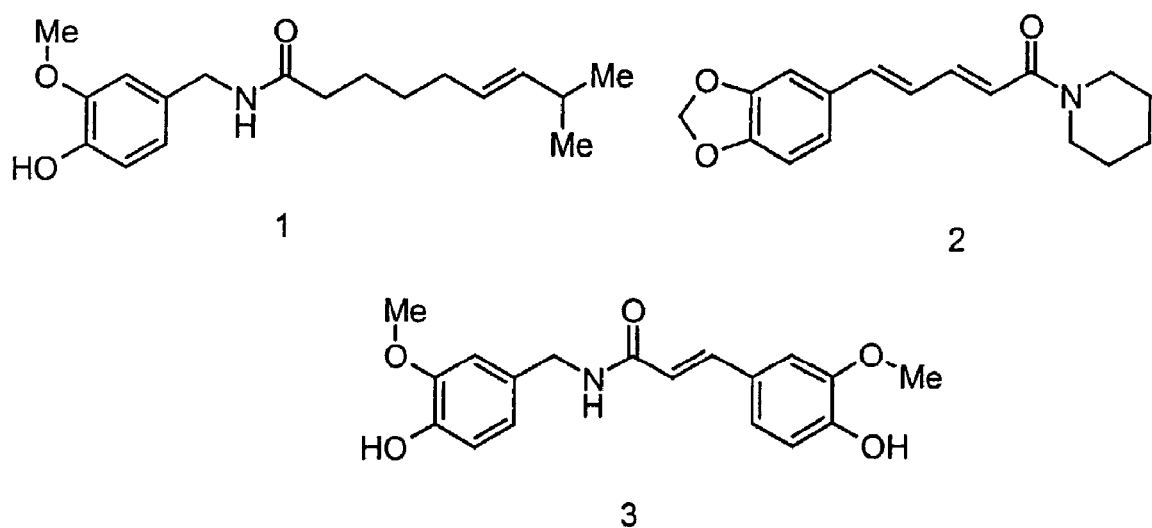
FIG. 1 illustrates the chemical formulae of 1: capsaicin, 2: piperine, 3: ferulic acid N-vanillylamide. In the formulae, Me is methyl.
Figure 2:
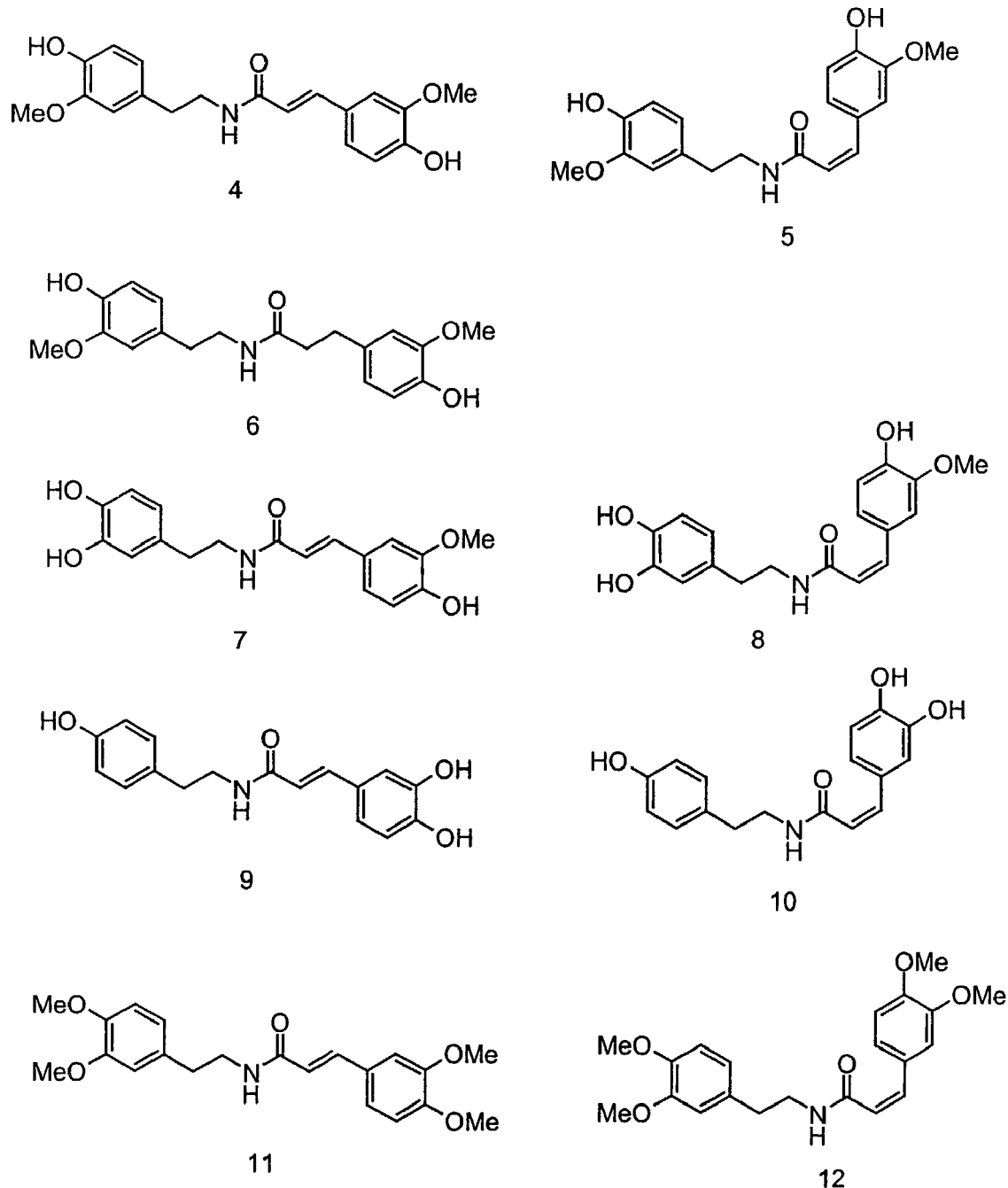
FIG. 2 illustrates the chemical formulae of 4: trans-feruloyl-methoxytyramine, 5: cis-feruloylmethoxytyramine, 6: dihydroferuloylmethoxytyramine, 7: trans-feruloyi-dopamine, 8: cis-feruloyldopamine, 9: trans-caffeoyltyramine, 10: cis-caffeoyltyramine, 11: trans-rubenamine, 12: cis-rubenamine. In the formulae, Me is methyl.

The various ferulic acid amides, their stereoisomers and salts can be used according to the present invention in each case alone or as mixtures.

The salts of the ferulic acid amides can be monovalent or if appropriate polyvalent phenolate salts with inorganic cations. Preference is given to the cations of lithium, sodium, potassium, the ammonium ion, the cations of magnesium, calcium and strontium, or the cations of aluminum, zinc, copper, iron or manganese.

Preferably, the ferulic acid amides of the present invention are used in combination with other pungent and/or hot-tasting substances or hot-tasting plant extracts. In this manner, a rounded sensory profile can be achieved. Preferably, the combination of one or more of the ferulic acid amides with an extract of pepper, water pepper, chilli, extract of grains of paradise or ginger in a weight ratio of 0.01:1 to 100:1, preferably 0.1:1 to 10:1, produces a pleasant sensory profile.

Other pungent and/or hot-tasting substances can be, for example, capsaicin, dihydrocapsaicin, gingerol, paradol, shogaol, piperine, carboxylic acid N-vanillylamides, preferably nonanoic acid N-vanillylamide, 2-alkenamides, in particular 2-nonenoic acid N-isobutylamide, pellitorine or spilanthol, 2-nonenoic acid N-4-hydroxy-3-methoxyphenylamide, alkyl ethers of 4-hydroxy-3-methoxybenzyl alcohol, in particular 4-hydroxy-3-methoxybenzyl n-butyl ether, alkyl ethers of 3-hydroxy-4-methoxybenzyl alcohol, alkyl ethers of 3,4-dimethoxybenzyl alcohol, alkyl ethers of 3-ethoxy-4-hydroxybenzyl alcohol, alkyl ethers of 3,4-methylenedioxybenzyl alcohol, nicotinaldehyde, methyl nicotinate, propyl nicotinate, 2-butoxyethyl nicotinate, benzyl nicotinate, 1-acetoxychavicol, polygodial or iso-drimeninol.

Pungent-tasting plant extracts can be all plant extracts suitable for nutrition which cause a pungent or hot sensory impression. Preferred pungent-tasting plant extracts are, for example, pepper extract (*Piper* ssp., preferably *Piper nigrum*), water pepper extract (*Polygonum* ssp., preferably *Polygonum hydropiper*), extracts of *Allium* ssp. (preferably onion and garlic extract), extracts of radish (*Raphanus* ssp.), horse radish extracts (*Cochlearia armoracia*), extracts of black (*Brassica nigra*), wild or yellow mustard (*Sinapis* ssp., preferably *Sinapis arvensis* and *Sinapis alba*), pellietory root extracts (*Anacyclus* ssp., in particular *Anacyclus pyrethrum* L.), cone flower extracts (*Echinaceae* ssp.), extracts of Szechwan pepper (*Zanthoxylum* ssp., in particular *Zanthoxylum piperitum*), Spilanthese extract (*Spilanthes* ssp., preferably *Spilanthes acmella*), chilli extract (Capsicum ssp., in particular *Capsicum frutescens*), grain of paradise extract (*Aframomum* ssp., preferably *Aframomum melegueta* [Rose] K. Schum.), ginger extract (*Zingiber* ssp., preferably *Zingiber officinale*) and galanga extract (*Kaempferia galanga* or *Alpinia galanga*).

The pungent-tasting plant extracts can be obtained from the corresponding fresh or dried plants or plant parts, preferably from white, green or black peppercorns, water peppercorns, onions and garlic, radish root, horse radish, mustard seed, cone flower root, pellitory root, plant parts from Zanthoxylum species, plant parts of spilanthes species, chilli peppers, grains of paradise or ginger or galanga roots, by extracting the dried plant parts, preferably comminuted in advance, with a solvent suitable for food and drink, but preferably ethanol, water, hexane or heptane, or ethanol/water mixtures, at 0° C. up to the boiling point of the respective solvent or mixture, then filtering and completely or partially concentrating the filtrate, preferably by distillation or spray-drying. The resultant crude extract can then be worked up further, for example it can be treated with steam at pressures from 0.01 mbar to atmospheric pressure and/or taken up in a solvent suitable for food and drink.

A solvent suitable for food and drink can be, for example, water, ethanol, methanol, propylene glycol, glycerol, acetone, dichloromethane, diethyl ether, hexane, heptane or supercritical carbon dioxide or mixtures of the above-mentioned solvents.

It has also proved to be advantageous that the ferulic acid amides of the present invention, preferably the ferulic acid amides in combination with pungent-tasting plant extracts, can imitate the pungent taste of alcohol in alcoholic beverages or preparations of alcoholic beverages and it is thus possible to make the alcohol content lower in alcoholic beverages or in preparations of alcoholic beverages while maintaining the sensory rating.

The present invention further relates to preparations used in nutrition, oral hygiene or consumed for pleasure containing N-[2-(4-hydroxy-3-methoxyphenyl)ethyl]-3-(4-hydroxy-3-methoxyphenyl)-(2E)-propenamide, N-[2-(4-hydroxy-3-methoxyphenyl)ethyl]-3-(4-hydroxy-3-methoxyphenyl)-(2Z)-propenamide, N-[2-(4-hydroxy-3-methoxyphenyl)ethyl]-3-(4-hydroxy-3-methoxyphenyl)-propenamide, N-[2-(3,4-dihydroxyphenyl)ethyl]-3-(4-hydroxy-3-methoxyphenyl)-(2E)-propenamide, N-[2-(3,4-dihydroxyphenyl)ethyl]-3-(4-hydroxy-3-methoxyphenyl)-(2Z)-propenamide, N-[2-(4-hydroxyphenyl)ethyl]-3-(3,4-dihydroxyphenyl)-(2E)-propenamide, N-[2-(4-hydroxyphenyl)ethyl]-3-(3,4-dihydroxyphenyl)-(2Z)-propenamide, N-[2-(3,4-dimethoxyphenyl)ethyl]-3-(3,4-dimethoxyphenyl)-(2E)-propenamide and/or N-[2-(3,4-dimethoxyphenyl)ethyl]-3-(3,4-dimethoxyphenyl)-(2Z)-propenamide.

The preparations of the present invention consumed for nutrition or pleasure contain the ferulic acid amides in an active amount and optionally other constituents. They generally contain 0.000001% to 10% by weight, preferably 0.0001 to 1% by weight, more preferably 0.0001% by weight to 0.1% by weight, based on the total weight of the preparation, of the ferulic acid amides or mixtures thereof. Other conventional base materials, aids and additives for foods or drinks can be present at amounts of 5 to 99.999999% by weight, preferably 10 to 80% by weight, based on the total weight of the preparation. In addition, the preparations can contain water at an amount of up to 99.999999% by weight, preferably 5 to 80% by weight, based on the total weight of the preparation.

The preparations consumed for nutrition or pleasure in the context of the present invention are, for example, bakery products (for example bread, dry biscuits, cakes, other baked goods), confectionery (for example types of chocolate, chocolates, sweets, hard and soft caramels, chewing gum), alcoholic or nonalcoholic beverages (for example coffee, tea, wine, wine-containing beverages, beer, beer-containing beverages, liqueurs, schnapps, wine brandies, fruit-containing lemonades, isotonic drinks, refreshments, nectars, fruit and vegetable juices, fruit juice or vegetable juice preparations), instant drinks, meat products (for example ham, fresh sausage preparations or uncooked sausage preparations), eggs or egg products (dried egg, egg white, egg yolk), cereal products (for example breakfast cereals, meusli bars), milk products (for example milk drinks, dairy ice cream, yogurt, kefir, fresh cheese, soft cheese, hard cheese, dried milk powder, butter, buttermilk, whey), fruit preparations (for example jams, marmalades, fruit ices, fruit sauces), vegetable preparations (for example ketchup, sauces, dried vegetables), snacks (for example baked or deep-fried potato crisps or potato dough products, maize- or peanut-based extrudates), fat- and oil-based products or emulsions thereof (for example mayonnaise, remoulade, dressings), prepared dishes and soups, spices, seasoning mixes and, preferably seasonings for sprinkling, which are used in the snacks sector. The preparations in the context of the present invention can also be used as semi-manufactured products for the production of further preparations consumed for nutrition or pleasure. The preparations in the context of the present invention can also be food supplements in the form of capsules, tablets (uncoated or coated tablets, for example coatings resistant to gastric juice), dragees, granules, pellets, solids mixtures, dispersions in liquid phases, as emulsions, as powders, as solutions, as pastes or as other swallowable or chewable preparations.

The present invention also relates to preparations used for oral hygiene, preferably as dental care compositions such as toothpastes, tooth gels, toothpowders, mouthwashes, chewing gums and other oral care compositions containing the ferulic acid amides in an active amount with or without other customary base materials, aids and additives for such preparations. They generally contain 0.000001% by weight to 10% by weight, preferably 0.0001 to 1% by weight, more preferably 0.0001% by weight to 0.1% by weight, based on the total weight of the preparation, of the ferulic acid amides or mixtures thereof. Other customary base materials, aids and additives for preparations used for oral hygiene can be present at amounts of 0.000001 to 99.999999% by weight, preferably 10 to 80% by weight, based on the total weight of the preparation. In addition, the preparations can contain water in an amount up to 99.999999% by weight, preferably 5 to 80% by weight, based on the total weight of the preparation.

Dental care compositions containing the ferulic acid amides according to the present invention generally contain an abrasive system (abrasive or polishes) for example silicic acids, calcium carbonates, calcium phosphates, aluminum oxides and/or hydroxylapatites, of surface active substances, for example sodium lauryl sulphate, sodium lauryl sarcosinate and/or cocamidopropylbetaine, of humectants, for example glycerol and/or sorbitol, of thickeners, for example carboxymethylcellulose, polyethylene glycols, carrageenans and/or Laponites®, of sweeteners, for example saccharin, of stabilizers and of active compounds, for example sodium fluoride, sodium monofluorophosphate, tin difluoride, quaternary ammonium compounds, zinc citrate, zinc sulphate, tin pyrophosphate, tin dichloride, mixtures of various pyrophosphates, triclosan, cetylpyridinium chloride, aluminum lactate, potassium citrate, potassium nitrate, potassium chloride, strontium chloride, hydrogen peroxide, flavors and/or sodium bicarbonate.

Chewing gums containing the ferulic acid amides of the present invention generally contain a chewing gum base, that is to say a gum base becoming plastic during chewing, of sugars of various types, sugar substitutes, sweeteners, sugar alcohols, humectants, thickeners, emulsifiers, stabilizers and flavors.

The preparations containing the ferulic acid amides of the present invention can be prepared in such a manner that the ferulic acid amides are incorporated as the substance alone, as a solution or in the form of a mixture with a solid or liquid carrier into the preparations consumed for nutrition or pleasure.

To produce the preparations, the ferulic acid amides and if appropriate, other constituents of the preparation of the present invention can also be incorporated in advance into emulsions, into liposomes, for example starting from phosphatidyl choline, into microspheres, into nanospheres or else into capsules made of a matrix suitable for food and drinks, for example of starch, starch derivatives, other polysaccharides, natural fats, natural waxes or proteins, for example gelatin. The ferulic acid amides can be complexed in advance with suitable complexing agents, for example with cyclodextrins or cyclodextrin derivatives, preferably β-cyclodextrin, and used in this form.

Further constituents which can be used for the preparations of the present invention consumed for nutrition or pleasure are customary base materials, aids and additives for foods and drinks, for example water, mixtures of fresh or processed, plant or animal base materials or raw materials (for example raw, fried, dried, fermented, smoked and/or cooked meat, egg, bones, cartilage, fish, vegetables, fruits, herbs, nuts, vegetable or fruit juices or pastes or mixtures thereof), digestible or indigestible carbohydrates (for example sucrose, maltose, fructose, glucose, dextrins, amylose, amylopectin, inulin, xylans, cellulose), sugar alcohols (for example sorbitol), natural or hardened fats (for example tallow, lard, palm kernel fat, coconut fat, hardened vegetable fat), oils (for example sunflower seed oil, peanut oil, maize germ oil, olive oil, thistle oil, fish oil, soybean oil, sesame seed oil), fatty acids or their salts (for example potassium stearate), proteinogenic or nonproteinogenic amino acids and related compounds (for example taurine, creatine, creatinine), peptides, native or processed proteins (for example gelatin), enzymes (for example peptidases, glycosidases, lipases), nucleic acids, nucleotides, taste-modulating substances (for example sodium glutamate, 2-phenoxy-propionic acid, hydroxyflavanones), emulsifiers (for example lecithins, diacylglycerols), stabilizers (for example carageenan, alginate), preservatives (for example benzoic acid, sorbic acid), antioxidants (for example tocopherol, ascorbic acid), chelators (for example citric acid), organic or inorganic acidulants (for example malic acid, acetic acid, citric acid, tartaric acid, phosphoric acid), additional bitter substances (for example quinine, caffeine, limonin), sweeteners (for example saccharin, cyclamate, aspartame, neotame, neohesperidine dihydrochalcone, sucralose), mineral salts (for example sodium chloride, potassium chloride, magnesium chloride, sodium phosphates), substances inhibiting enzymatic browning (for example sulphite, ascorbic acid), essential oils, plant extracts, natural or synthetic colours or colour pigments (for example carotenoids, flavonoids, anthocyans, chlorophyll and derivatives thereof), spices, and odour compounds, synthetic, natural or nature-identical flavor and taste compounds.

Preferably, the inventive preparations can also contain a flavor composition in order to round off and refine the taste and/or odor of the preparation. Suitable flavor compositions contain, for example, synthetic, natural or nature-identical flavor compounds and odor compounds, preferably other pungent or hot-tasting substances.

The present invention further relates to the use of the preparations as semi-manufactured products for flavoring preparations fabricated therefrom as finished goods.

The present invention further relates to the use of the preparations as odor, flavor or taste composition or as a seasoning mixture.

EXAMPLES

Example 1

Tasting the Pungent Compounds Trans-feruloyl-methoxytyramine, Cis-feruloylmethoxytyramine, Trans-caffeoyltyramine, Trans-rubenamine and Piperine The substance, under test, was dissolved in ethanol and the ethanolic solution was then diluted with an 11% strength by weight sugar solution (final concentration: c). For tasting, in each case approximately 5 ml of the sugar solution was swallowed. If the threshold value of the substance was known, a value just above the threshold value is chosen for the tasting. A group of 8 testers tasted the solutions.

Profile of Trans-feruloylmethoxytyramine:

c=10 ppm: body, sweet, heat develops after delay, long-lasting, especially in the pharyngeal cavity (in the case of 4 participants), adherent, slightly anaesthetizing action c=20 ppm: sweet, aniseed-like, benzaldehyde, heat develops after a delay (in the case of 8 participants), long-lasting, especially in the pharyngeal cavity, pleasant pepper pungency Profile of Cis-feruloylmethoxytyramine:

c=1 ppm: pungency builds up slowly.

Profile of Trans-caffeoyltyramine:

c=1 ppm: pungency occurs after a delay, anaesthetizing pungency.

Profile of Trans-rubenamine:

c=1 ppm: pleasant mild pungency, builds up slowly.

Comparative Test

Profile of Piperine:

c=500 ppb: weak development of heat after a long delay (in the case of 6 participants), neutral pungency occurring after a delay (in the case of 6 participants)

c=20 ppm: weak development of heat after a long delay (in the case of 8 participants), sharp, burning, persistent, peppercorn, in the entire oral region (in the case of 8 participants)

Example 2

Use of Trans-feruloylmethoxytyramine in Liqueur Beverages as Sensory Alcohol Substitute The grains of paradise extract used below was prepared by stirring 800 g of ground grains of paradise with 4 kg of ethanol (96% by volume). After filtration the filtrate was concentrated to 40 g and treated with steam at 100° C. and 300 mbar. The extract was made up to 80 g with ethanol (96% by volume).

As commercially conventional model systems, a liqueur base of 10% by volume and a liqueur base of 5.5% by volume were selected. The composition is shown in Tables 1 and 2.

TABLE 1

Model system A; liqueur base 10% by volume

|  | Amount used in % by weight |
|---|---|
| Ethanol absolute, food quality | 7.39% |
| Invert sugar syrup 66.5% (dry matter) | 20.00% |
| Mains water | 72.61% |
| Total | 100.00% |

TABLE 2

Model system B; liqueur base 5.5% by volume

|  | Amount used in % by weight |
|---|---|
| Ethanol absolute, food quality | 4.06% |
| Invert sugar syrup 66.5% (dry matter) | 20.00% |
| Mains water | 75.94% |
| Total | 100.00% |

To the model system A were then added the solution of the extract of grains of paradise (1% by weight in ethanol (EtOH)) at concentrations of 1 to 3% by weight, based on the total weight of the model system, and a solution of trans-feruloylmethoxytyramine (1% by weight in ethanol) at a concentration of 1% by weight, based on the total weight of the model system. Using a taste-testing group of 8 people, the effect of grains of paradise extract addition and trans-feruloylmethoxytyramine addition on the sensory profile were then tested. The sensory assessment was made on a scale of 1 (weak) to 5 (strong). The results are shown in Table 3.

TABLE 3

Sensory assessment of the pungency of a liqueur base with addition of grains of paradise extract and trans-feruloylmethoxytyramine

| Addition to model system A | Pungency (median), Scale 1-5 | Sensory description |
|---|---|---|
| 1% by weight grains of paradise extract solution (1% by weight in EtOH) | 1.5 | Weak effect, slight vanilla note, slightly pungent |
| 2% by weight grains of paradise extract solution (1% by weight in EtOH) | 3.25 | Readily identifiable, good, correct effect, too pungent, sweet, vanilla, unpleasant aftertaste, very vigorous |
| 3% by weight grains of paradise extract solution (1% by weight in EtOH) | 5 | Too pungent, too strong, burning, biting aftertaste (ginger), very clinging |
| 1% by weight trans-feruloylmethoxytyramine solution (1% by weight in EtOH) | 2 | Sweet, vanilla, fruity, less bitter, correct effect, slight pungency in the impact, after 10 sec vigorous pungency, pleasant, little pungency in aftertaste, not very clinging |

Then, to model system A the solution of a grains of paradise extract (10% by weight in ethanol) was added at concentrations of 0.1 to 0.2% by weight, based on the total weight of the model system, and a solution of trans-feruloylmethoxytyramine (10% by weight in ethanol) at a concentration of 0.01 to 0.02% by weight, based on the total weight of the model system. Using a taste-testing group of 8 people, again the effect of grains of paradise extract addition and of trans-feruloylmethoxytyramine addition on the sensory profile were tested. In addition, the combined action was tested. The results are shown in Table 4.

TABLE 4

Test of the combined action of grains of paradise extract and trans-feruloylmethoxytyramine.

| Addition to model system A | Comments |
|---|---|
| 0.015% by weight grains of paradise extract solution (10% by weight in EtOH) | Strong, good effect, sharp alcoholic pungency |
| 0.02% by weight trans-feruloylmethoxytyramine solution (10% by weight EtOH) | Mild, pungency very similar to alcoholic pungency |
| 0.01% by weight grains of paradise extract solution (10% by weight in EtOH) and 0.01% by weight trans-feruloylmethoxytyramine solution (10% by weight in EtOH) | Very mild, slight pungency |
| 0.01% by weight grains of paradise extract solution (10% by weight in EtOH) and 0.02% by weight trans-feruloylmethoxytyramine solution (10% by weight in EtOH) | Profile similar to alcoholic pungency, very mild |
| 0.015% by weight grains of paradise extract solution (10% by weight in EtOH) and 0.015% by weight trans-feruloylmethoxytyramine solution (10% by weight in EtOH) | Marked pungency, strong, similar to alcoholic pungency |

After the individual testing and the combined testing clearly showed the effect of alcoholic pungency, a direct comparison of model system A having an alcohol strength of 10% by volume and model system B of 5.5% by volume was performed. Model system B received an addition of grains of paradise extract solution (10% by weight in EtOH) and trans-feruloylmethoxytyramine solution (10% by weight in EtOH) up to the concentrations reported. The results of the comparative testing are shown in Table 5.

TABLE 5

Comparative testing of model system A without addition and model system B with combined addition of grains of paradise extract and trans-feruloylmethoxytyramine.

| Addition to model system B | Sensory comparison of model system B with model system A (without addition) |
|---|---|
| 0.3% by weight grains of paradise extract solution (10% by weight in EtOH) | Strong, good effect, sharp alcoholic pungency, too strong compared with model system A |
| 0.2% by weight grains of paradise extract solution (10% by weight in EtOH) | Balanced, pungency very similar to alcoholic pungency in model system A |
| 0.2% by weight grains of paradise extract solution (10% by weight in EtOH) and 0.2% by weight trans-feruloylmethoxytyramine (10% by weight in EtOH) | Pungency, time-intensity behavior similar to the alcoholic pungency in model system A |
| 0.075% by weight grains of paradise extract solution (10% by weight in EtOH) and 0.025% by weight trans-feruloylmethoxytyramine (10% by weight in EtOH) | Profile similar to alcoholic pungency, authentic time-intensity profile compared to alcoholic pungency of model system A |

This use example demonstrated that alcoholic pungency can be imitated by defined combinations of trans-feruloylmethoxytyramine having pungent-tasting plant extracts, here, in the example, grains of paradise extract.

Example 3

Use of Trans-feruloylmethoxytyramine in Gelled Fruits as Flavor Intensifier

As commercially conventional model system, flavor combinations in gelled fruits having elderberry flavor were used:

TABLE 6

Gelled fruits having elderberry flavor 0.07% by weight, based on the total weight of the preparation

| Addition of trans-feruloylmethoxytyramine solution (1% by weight in ethanol) | Sensory description |
|---|---|
| 0.015% by weight | Effect only slightly perceptible |
| 0.03% by weight | Effect below threshold, but pleasant |
| 0.045% by weight | Flavor fresh and rounded |

Example 4

Use in an Apple Schnapps as Alcohol Intensifier

| Sample A: | |
|---|---|
| 20 l | Alcohol 96% by volume |
| 5.2 l | Flavor (natural apple fruit juice liqueur flavor, 15% by volume) |
| 27 kg | Sugar syrup |
| 1 kg | Citric acid monohydrate |
| Make up to 100 l with de-mineralized water | |
| Total amount 100 l | |

| Sample B: | |
|---|---|
| 14.90 l | Alcohol 96% by volume |
| 5.2 l | Flavor (natural apple fruit juice liqueur flavor, 15% by volume, contains 0.01% by weight trans-feruloylmethoxytyramine) |
| 27 kg | Sugar syrup |
| 1 kg | Citric acid monohydrate |
| Make up to 100 l with de-mineralized water | |
| Total amount 100 l | |

Sensory assessment Sample A: medium alcoholic pungency
Sensory assessment Sample B: medium alcoholic pungency, further pungency identifiable

| Component | Constituent | Amount used in % by weight |
|---|---|---|
| A | Demineralized water | 22.00 |
| | Sorbitol (70%) | 45.00 |
| | Solbrol ® M, sodium salt (Bayer AG, p-hydroxybenzoic acid alkylester) | 0.15 |
| | Trisodiumphosphate | 0.10 |
| | Saccharin, 450 fold | 0.20 |
| | Sodium monofluorophosphate | 1.12 |
| | Polyethylene glycol 1500 | 5.00 |
| B | Sident 9 (abrasive silicon dioxide) | 10.00 |
| | Sident 22 S (thickening silicon dioxide) | 8.00 |
| | Sodium carboxymethylcellulose | 0.90 |
| | Titanium dioxide | 0.50 |
| C | Demineralized water | 4.53 |
| | Sodium lauryl sulphate | 1.50 |
| D | Flavor containing 0.1% trans-feruloylmethoxytyramine | 1 |

The constituents of components A and B are premixed for each component separately and stirred well together under vacuum for 30 min at 25-30° C. Component C is premixed and added to A and B; D is added and the mixture is stirred thoroughly under vacuum at 25-30° C. for 30 min. After release of vacuum, the toothpaste is finished and can be packaged.

Example 6

Use in a Sugar-Free Chewing Gum as Flavor

| Component | Constituent | Amount used in % by weight |
|---|---|---|
| A | Chewing gum base, Company "Jagum T" | 30.00 |
| B | Sorbitol, pulverized | 39.00 |
| | Isomalt ® (Palatinit GmbH) | 9.50 |
| | Xylitol | 2.00 |
| | Mannitol | 3.00 |
| | Aspartame | 0.10 |
| | Acesulfame-K | 0.10 |
| | Emulgum ® (Colloides Naturels, Inc.) | 0.30 |
| C | Sorbitol, 70% | 14.00 |
| | Glycerol | 1.00 |
| D | Flavor containing 0.1% trans-feruloylmethoxytyramine | 1 |

Components A to D are mixed and kneaded intensively. The raw mass can be processed, for example, in the form of thin strips, to give ready-to-eat chewing gums.

Example 7

Use in a Mouthwash as Flavor

| Component | Constituent | Amount used in % by weight |
|---|---|---|
| A | Ethanol | 10.00 |
| | Cremophor ® CO 40 (BASF, Detergent) | 1.00 |
| | Benzoic acid | 0.12 |
| | Flavor containing 0.4% trans-feruloylmethoxy-tyramine | 0.25 |
| B | Demineralized water | 83.46 |
| | Sorbitol, 70% | 5.00 |
| | Sodium saccharin 450 | 0.07 |
| | L-Blue 5000 e.c., 1% in water (dye) | 0.10 |

The constituents of components A and B are each mixed separately. Component B is slowly stirred in component A until the mixture is homogeneous.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for modifying the flavor or fragrance of a food or beverage comprising adding to said food or beverage an organoleptically effective amount of a compound selected from the group consisting of N-[2-(4-hydroxy-3-methoxyphenyl)ethyl]-3-(4-hydroxy-3-methoxyphenyl)-(2Z)-propenamide, N-[2-(4-hydroxy-3-methoxyphenyl)ethyl]-3-(4-hydroxy-3-methoxyphenyl)propenamide, N-[2-(3,4-dihydroxyphenyl)ethyl]-3-(4-hydroxy-3-methoxyphenyl)-(2E)-propenamide, N-[2-(3,4-dihydroxyphenyl)ethyl]-3-(4-hydroxy-3-ethoxy-phenyl)-(2Z)-propenamide, N-[2-(4-hydroxyphenyl)ethyl]-3-(3,4-dihydroxyphenyl)-(2E)-propenamide, N-[2-(4-hydroxyphenyl)ethyl]-3,4-dihydroxyphenyl)-(2Z)-propenamide, N-[2-(3,4-dimethoxyphenyl)ethyl]-3-(3,4-dimethoxyphenyl)-(2E)-propenamide, and N-[2-(3,4-dimethoxyphenyl)ethyl]-3-(3,4-dimethoxyphenyl)-(2Z)-propenamide or mixtures thereof, wherein said organoleptically effective amount is sufficient to impart a pungent flavor, a heat-generating flavor, or both.

2. The method of claim 1 wherein the organoleptic compound is selected from the group consisting of N-[2-(3,4dihydroxyphenyl)ethyl]-3-(4-hydroxy-3-methoxyphenyl)-(2E)-propenamide, N-[2-(3,4-dihydroxyphenyl)ethyl]-3-(4-hydroxy-3-methoxyphenyl)-(2Z)-propenamide, N-[2-(4-hydroxyphenyl)ethyl]-3-(3,4-dihydroxyphenyl-(2E)-propenamide, N-[2-(4-hydroxyphenyl)ethyl]-3-(3,4-dihydroxyphenyl)-(2Z)-propenamide, N-[2-(3,4-dimethoxyphenyl)ethyl]-3-(3,4-dimethoxyphenyl)-(2E)-propenamide, and N-[2-(3,4-dimethoxyphenyl)ethyl]-3-(3 4-dimethoxyphenyl)-(2Z)-propenamide and mixtures thereof.

3. A method for modifying the fragrance of an odor compound comprising adding to said odor compound an organoleptically effective amount of a compound selected from the group consisting of N-[2-(4-hydroxy-3-methoxyphenyl)-ethyl]-3-(4-hydroxy-3-methoxyphenyl)-(2Z)-propenamide, N-[2-(4-hydroxy-3-methoxyphenyl)ethyl]-3-(4-hydroxy-3-methoxyphenyl)propenamide, N-[2-(3,4-dihydroxyphenyl)ethyl]-3-(4-hydroxy-3-methoxyphenyl)-(2E)-propenamide, N-[2-(3,4-dihydroxyphenyl)ethyl]-3-(4-hydroxy-3-methoxyphenyl)-(2Z)-propenamide, N-[2-(4-hydroxyphenyl)ethyl]-3-(3,4-dihydroxyphenyl)-(2E)-propenamide, N-[2-(4-hydroxyphenyl)ethyl]-3-(3,4-dihydroxyphenyl)-(2Z)-propenamide, N-[2-(3,4-dimethoxyphenyl)ethyl]-3-(3,4-dimethoxyphenyl)-(2E)-propenamide and N-[2-(3,4-dimethoxyphenyl)ethyl]-3-(3,4-dimethoxyphenyl)-(2Z)-propenamide or mixtures thereof, wherein said organoleptically effective amount is sufficient to impart a pungent flavor, a heat-generating flavor, or both.

4. The method of claim 3, wherein the organoleptic compound is selected from the group consisting of N-[2-(3,4-dihydroxyphenyl)ethyl]-3-(4-hydroxy-3-methoxyphenyl)-(2E)-propenamide, N-[2-(3,4-dihydroxyphenyl)ethyl]-3-(4-hydroxy-3-methoxyphenyl)-(2Z)-propenamide, N-[2-(4-hydroxyphenyl)ethyl]-3-(3,4-dihydroxyphenyl-(2E)-propenamide, N-[2-(4-hydroxyphenyl)ethyl]-3-(3,4-dihydroxyphenyl)-(2Z)-propenamide, N-[2-(3,4-dimethoxyphenyl)ethyl]-3-(3,4-dimethoxyphenyl)-(2E)-propenamide, and N-[2-(3,4-dimethoxyphenyl)ethyl]-3-(3,4-dimethoxyphenyl)-(2Z)-propenamide and mixtures thereof.

5. A nutritional, oral hygiene or pleasure composition comprising a base nutritional, hygiene or pleasure composition and an organoleptically effective amount of a compound selected from the group consisting of N-[2-(4-hydroxy-3-methoxyphenyl)-ethyl]-3-(4-hydroxy-3-methoxyphenyl)-(2Z)-propenamide, N-[2-(4-hydroxy-3-methoxyphenyl)ethyl]-3-(4-hydroxy-3-methoxyphenyl)propenamide, N-[2-(3,4-dihydroxyphenyl)ethyl]-3-(4-hydroxy-3-methoxyphenyl)-(2E)-propenamide, N-[2-(3,4-dihydroxyphenyl)ethyl]-3(4-hydroxy-3-methoxyphenyl)-(2Z)-propenamide, N-[2-(4-hydroxyphenyl)ethyl]-3-(3,4-dihydroxyphenyl)-(2E)-propenamide, N-[2-(4-hydroxyphenyl)ethyl]-3-(3,4-dihydroxyphenyl)-(2Z)- propenamide, N-[2-(3,4-dimethoxyphenyl)ethyl]-3(3,4-dimethoxyphenyl)-(2E)-propenamide, and N-[2-(3,4-dimethoxyphenyl)ethyl]-3-(3,4-dimethoxyphenyl)-(2Z)-propenamide and mixtures thereof, wherein said organoleptically effective amount is sufficient to impart a pungent flavor, a heat-generating flavor, or both.

6. The composition according to claim 5 comprising at least one further pungent or heat-generating substance.

7. The composition according to claim 5 further comprising at least one pungent-tasting plant extract.

8. The composition according to claim 5 comprising at least one further pungent or heat-generating substance and at least one pungent-tasting plant extract.

9. The composition of claim 5, wherein the organoleptic compound is selected from the group consisting of N-[2-(3,4-dihydroxyphenyl)ethyl]-3(4-hydroxy-3-methoxyphenyl)-(2E)-propenamide, N-[2-(3,4-dihydroxyphenyl)ethyl]-3-(4-hydroxy-methoxyphenyl)-(2Z)-propenamide, N-[2-(4-hydroxyphenyl)ethyl]-3-(3,4-dihydroxyphenyl)-(2E)-propenamide, N-[2-(4-hydroxyphenyl)ethyl]-3-(3,4-dihydroxyphenyl)-(2Z)-propenamide, N-[2-3,4-dimethoxyphenyl)ethyl]-3-(3,4-dimethoxyphenyl)-(2E)-propenamide, and N-[2-(3,4-dimethoxyphenyl)ethyl]-3-(3,4-dimethoxyphenyl)-(2Z)-propenamide and mixtures thereof.

10. An alcoholic beverage comprising base alcoholic beverage and an organopleptically effective amount of a compound selected from the group consisting of N-[2-(4-hydroxy-3-methoxyphenyl)-ethyl]-3-(4-hydroxy-3-methoxyphenyl)-(2Z)-propenamide, N-[2-(4-hydroxy-3-methoxyphenyl)ethyl]-3-(4-hydroxy-3-methoxyphenyl)propenamide, N-[2-(3,4-dihydroxyphenyl)ethyl]-3-(4-hydroxy-3-methoxyphenyl)-(2E)-propenamide, N-[2-(3,4-dihydroxyphenyl)ethyl]-3-(4-hydroxy-3-methoxyphenyl)-(2Z)-propenamide, N-[2-(4-hydroxyphenyl)ethyl]-3-(3,4-dihydroxyphenyl)-(2E)-propenamide, N-[2-(4-hydroxyphenyl)ethyl]-3-(3,4-dihydroxyphenyl)-(2Z)-propenamide, N-[2-(3,4-dimethoxyphenyl)ethyl]-3-(3,4-dimethoxyphenyl)-(2E)-propenamide, and N-[2-(3,4-dimethoxyphenyl)ethyl]-3-(3,4-dimethoxyphenyl)-(2Z)-propenamide and mixtures thereof, wherein said organoleptically effective amount is sufficient to impart a pungent flavor, a heat-generating flavor, or both.

11. The composition of claim 10, wherein the organoleptic compound is selected from the group consisting of N-[2-(3, 4-dihydroxyphenyl)ethyl]-3-(4-hydroxy-3-methoxyphenyl)-(2E)-propenamide, N-[2-(3,4-dihydroxyphenyl)ethyl]-3-(4-hydroxy-3-methoxyphenyl)-(2Z)-propenamide, N-[2-(4-hydroxyphenyl)ethyl]-3-(3,4-dihydroxyphenyl)-(2E)-propenamide, N-[2-(4-hydroxyphenyl)ethyl]-3-(3,4-dihydroxyphenyl)-(2Z)-propenamide, N-[2-(3,4-dimethoxyphenyl)ethyl]-3-(3,4-dimethoxyphenyl)-(2E)-propenamide, and N-[2-(3,4-dimethoxyphenyl)ethyl]-3-(3, 4-dimethoxyphenyl)-(2Z)-propenamide and mixtures thereof.

12. A seasoning mixture comprising a seasoning base and an organoleptically effective amount of a compound selected from the group consisting of N-[2-(4-hydroxy-3-methoxyphenyl)-ethyl]-3-(4-hydroxy-3-methoxyphenyl)-(2Z)-propenamide, N-[2-(4-hydroxy-3-methoxyphenyl)ethyl]-3-(4-hydroxy-3-methoxyphenyl)propenamide, N-[2-(3,4-dihydroxyphenyl)ethyl]-3(4-hydroxy-3-methoxyphenyl)-(2E)-propenamide, N-[2-(3,4-dihydroxyphenyl)ethyl]-3-(4-hydroxy-3-methoxyphenyl)-(2Z)-propenamide, N-[2-(4-hydroxyphenyl)ethyl]-3-(3,4-dihydroxyphenyl)-(2E)-propenamide, N-[2-(4-hydroxyphenyl)ethyl]-3-(3,4-dihydroxyphenyl)-(2Z)-propenamide, N-[2-(3,4-dimethoxyphenyl)ethyl]-3-(3,4-dimethoxyphenyl)-(2E)-propenamide, and N-[2-(3,4-dimethoxyphenyl)ethyl]-3-(3, 4-dimethoxyphenyl)-(2Z)-propenamide and mixtures thereof, wherein said organoleptically effective amount is sufficient to impart pungent flavor, a heat-generating flavor, or both.

13. The composition of claim 12, wherein the organoleptic compound is selected from the group consisting of N-[2-(3,4-dihydroxyphenyl)ethyl]-3-(4-hydroxy-3-methoxyphenyl)-(2E)-propenamide, N-[2-(3,4-dihydroxyphenyl)ethyl]-3-(4-hydroxy-3-methoxyphenyl)-(2Z)-propenamide, N-[2-(4-hydroxyphenyl)ethyl]-3-(3,4-dihydroxyphenyl)-(2E)-propenamide, N-[2-(4-hydroxyphenyl)ethyl]-3-(3,4-dihydroxyphenyl)-(2Z)-propenamide, N-[2-(3,4-dimethoxyphenyl)ethyl]-3-(3,4-dimethoxyphenyl)-(2E)-propenamide, and N-[2-(3,4-dimethoxyphenyl)ethyl]-3-(3, 4-dimethoxyphenyl)-(2Z)-propenamide and mixtures thereof.

* * * * *